Patented Oct. 14, 1941

2,259,190

UNITED STATES PATENT OFFICE 2,259,190

RUBBER CHLORIDE COMPOSITION AND METHOD OF TREATING SAME

Herbert A. Winkelmann, Chicago, Ill., and Eugene W. Moffett, Milwaukee, Wis., assignors to Marbon Corporation, Gary, Ind., a corporation of Delaware No Drawing. Application February 23, 1940, Serial No. 320,468

7 Claims. (Cl. 260—735)

This application is a continuation in part of our co-pending applications Serial No. 255,724, filed February 10, 1939, and Serial No. 55,685, filed December 21, 1935, which in turn are in part continuations of application Serial No. 55,684, filed December 21, 1935, now Patent No. 2,147,620, dated February 14, 1939.

This invention relates to halogen containing rubber derivative compositions and methods of treating same. It includes liquid coating compositions comprising chlorinated rubber capable of curing to a relatively non-thermoplastic adhesive product on drying and heating. Such compositions are particularly adapted for bonding together rubber or the like to metal to give a composite product, but may be used for general adhesive purposes, or for varnishes and the like, to give a coating over rubber, wood, metal, etc.

One embodiment of this invention is a composition comprising a rubber chloride, a volatile solvent, a minor amount of an organic accelerator for the vulcanization of rubber, and preferably also a vulcanizing agent for rubber such as sulfur.

The rubber chloride is preferably of the type in which the double bonds are saturated and may contain chlorine of substitution. Such products are well known and contain about 55% to 66% chlorine. However, low chlorine rubber chloride may be used such as those containing 20% chlorine or even less. The commercial rubber chloride sold under the trade name "Tornesit" has been found satisfactory in the practice of this invention.

An adhesion of rubber or Neoprene to metal which is superior to that obtained by vulcanizing rubber or Neoprene in direct contact with metal is obtained by applying a solution of rubber chloride in volatile solvent mixed with an organic accelerator and preferably also sulfur to the metal, evaporating the volatile solvent, superimposing a layer of vulcanizable rubber containing sulfur and accelerator over the rubber chloride composition, and subjecting the composite product to heat and pressure sufficient to vulcanize the rubber.

The compositions shown in the following table are particularly suitable for bonding rubber or Neoprene to metal.

TABLE

*Exemplary composition*

|  | Best | Variations |
|---|---|---|
| Rubber chloride: (65% chlorine content) | 100 | 100 |
| Vulcanizing agent: Sulfur | 50 | 20–80 |
| Accelerator: Butyraldehyde-aniline | 3 | 2–10 |
| Plasticizer: Dibutyl phthalate | 75 | 25–100 |
| Heat stabilizer: | | |
|   Magnesium oxide (MgO) | 10 | 0–20 |
|   Lead oxide (PbO) | 10 | 0–20 |

It should be understood, however, that the above formulae are but illustrations of embodiments of this invention.

Hard or soft rubber may be used. Pure gum stock and unmodified reclaim give good results, but many stocks have oils and fillers which are apt to lessen the adhesion so that care must be taken in their choice, and the proportions of modifiers in the rubber chloride must be varied according to the type of plasticizers and fillers in the rubber stock. In general, any vulcanizable rubber or rubber-like material can be used. It is also possible to use a pre-vulcanized rubber. Tread stocks and the like may be improved in ability to adhere to metal by compounding with reclaim.

Other vulcanizing agents than sulfur may be used, as for example, selenium. The use of sulfur or like material is not absolutely essential, particularly when an organic accelerator or "petronizing" agent is present.

Other accelerators for the vulcanization of rubber chloride than butyraldehyde-aniline may be used. Piperidinium penta-methylene dithiocarbamate gives good results. Tetramethyl thiuram disulphide and also the monosulphide are particularly effective. The use of an accelerator is not absolutely essential, but is preferable either with or without sulfur.

The choice of a proper plasticizer is important. The placticizer, however, is not essential even in the preferred composition, but many plasticizers greatly improve the adhesiveness of the rubber halide to the metal and to the rubber. However, there are some materials which are splendid softeners or plasticizers for rubber halide which give negative results or are actually detrimental to adhesion, particularly to the adhesion of the rubber halide to the rubber. Dibutyl phthalate has an effect on the rubber as well as on the rubber chloride, which results in a superior bond of the rubber chloride to the rubber. Other materials which may be used satisfactorily in place of dibutyl phthalate, although not with such good results, are butyl stearate, butyl oleate, butyl ricinoleate, chlorinated paraffin, ester gum, maleic anhydride and drying oils.

The use of heat stabilizers such as magnesium oxide, magnesium carbonate and lead oxide, is useful in the heat treatment and in the mixing of the ingredients when the mixture is made by milling.

Milling of the sulfur and other solids into the rubber chloride results in a better dispersion and appears to give a composition of better bonding power. Furthermore, the milled mixture dissolves more readily in benzol or other solvents, forming a cement which is less viscous than the unmilled products. A cement or liquid coating composition comprising an intimate dispersion of the materials of the table in benzol or like volatile solvent to form an approximately 20% solution is particularly adaptable for coating metal.

The article which is to be coated with rubber, for example a steel plate, is cleaned free of grease and scale, as for example by sand blasting. The article is then given a uniform coat of the cement described above. The coating may then be dried to obtain a film. However, as an alternative method, a preformed sheet of the rubber chloride composition without solvents may be superimposed on the metal. Such a preformed sheet may be obtained by milling and calendering the composition into a sheet. A layer of vulcanizable rubber is then applied over the rubber halide and metal, and the composite structure is vulcanized or petronized under pressure in a heated mold or in a vulcanizer containing steam or hot water under pressure. The temperature and time of cure may vary within wide limits, and is necessarily more for some types of stock than others. A temperature of 290° F. and a time of twenty minutes has been found satisfactory for the compositions of the table using a pure gum stock. At this temperature and time, for example, the rubber and rubber halide both become cured or vulcanized, and both become relatively non-thermoplastic. The vulcanization or petronizing of the rubber halide improves its adhesive properties, particularly at elevated temperatures. Thus it becomes possible to remove the composite vulcanized product from a hot mold with consequent saving of time and expense. The vulcanized or petronized rubber chloride bond is also more resistant to solvents, lubricating oils and the like than an unvulcanized or non-petronized chloride.

Rubber adhered to metal by the process described above can be bonded to the metal so that it cannot be torn loose, the strength of the adhesive bond exceeding the strength of the rubber.

The proportions in the formulae given above, however, in many cases must be modified to obtain this result with all types of rubber stock. The following example gives a specific working illustration of one embodiment of this invention.

EXAMPLE

The cement was made up of the following composition:

| | Parts by weight |
|---|---|
| "Tornesit" (rubber chloride) | 100 |
| Benzol | 700 |
| Sulfur | 7 |
| Butyraldehyde-aniline ("808") | 5 |
| Magnesium oxide (MgO) | 10 |
| Litharge (PbO) | 10 |
| Chlorinated paraffin (P-25") | 5 |

The above cement was coated on a one-inch-wide steel plate, the benzol allowed to evaporate to give a film, and a reclaim rubber stock then pressed on the film on the plate. The assembly was then heated for thirty minutes at 288° F. The bond was then tested by applying a weight to the rubber on the plate. At 26.4 lbs., the reclaim rubber stock broke, but the bond between the rubber and steel plate was still good.

Although the invention has been described as carried out with an unvulcanized rubber, it may be carried out with advantages with prevulcanized rubber. A composite product of metal, rubber halide containing sulfur and accelerator, and vulcanized rubber can be bonded together by vulcanization in a shorter time than required for the curing of a composite product comprising unvulcanized rubber. The composite structure may be bonded together by pressure. It is advisable, however, to subject the structure to heat sufficient to at least thermoplasticize the rubber halide, and preferably sufficient to cure or vulcanize the rubber halide.

In the case of some rubber stocks, as for example a tread stock containing large percentages of carbon black, it is advisable to use a partition coating. The rubber halide composition is coated on the metal. Then a partition coating composed of, for example, 100 parts by weight of tread stock, 200 parts by weight of reclaim is coated over the rubber halide. The tread stock is then superimposed on the partition coating, and the entire assembly subjected to heat and pressure sufficient to cure the rubber and rubber chloride. Some stocks such as high carbon containing tread stocks and certain reclaim appear to adhere better to the partition coating than to the rubber chloride composition. The rubber chloride compositions, on the other hand, seem to adhere better to the metal than the partition coating will adhere to the metal, and also forms a strong bond with the partition coating.

The use of rubber bromide in place of rubber chloride is within the bounds of this invention. Halogenated rubber hydrohalides and rubber hydrohalides may be used to some extent, but in many important respects they act entirely differently than the halides, as for example, in their stability, particularly under the influence of heat. It has been found that the rubber halides have such properties that they of themselves and in conjunction with other materials give a superior rubber to metal bond.

However, the rubber hydrohalides are operable and the rubber hydrohalide compositions containing sulfur act similarly to the rubber halide compositions. Rubber hydrochloride, for example, may be substituted for rubber chloride in the formulae of the table, the composition interposed between rubber and metal and the assembly subject to heat and pressure to cure as with the curing of the rubber halide compositions. It is believed that the rubber chloride containing sulfur and accelerator is also vulcanized, although the action is apparently slower than with rubber hydrohalides. Whatever the action, the addition of sulfur to the rubber chloride improves the strength of the metal to rubber bond.

Rubber chloride carrying 64 to 66 per cent chlorine has been known very many years, but it is less used in coatings and plastics than its inherent properties warrant. It is un-inflammable, stable, quite inert against chemical actions, and is resistant to most of the common liquids with which a coating or plastic article would come into contact. In particular, it is not affected by water or aqueous solutions of acids, salts and alkalies, by alcoholic liquids or alcohol itself, by petroleum oils, such as gasoline, lubricating oil and crude oil, etc. It is soluble in a few solvents, but it is not indefinitely miscible with all these.

Rubber chloride is made by chlorinating rubber in solution in carbon tetrachloride, or some other chlorinated solvent resistant to chlorine; the introduction of the gas being continued as long as it is taken up. In so doing, the unsaturated character of the original rubber disappears. Commercial rubber chloride is a non-thermoplastic, solid, friable resin which alone has no great value, but which can be compounded by mixing, solution, solvation, etc., with plasticizing bodies obviating its brittleness and friability and giving materials useful in coatings and in plastics. Light oils from coal tar (benzol, toluol, xylol, etc.) are used as solvents and thinners. After removal of the solvent, the resulting dry material is substantially inert and is more or less thermoplastic, this depending on the degree to which it has been plasticized and the particular plasticizer used. Coatings can be made containing rubber chloride having unusual water resistance, unusual acid resistance, good electrical insulating properties, and a good heat stability up to 150° C. or thereabouts. It is largely a matter of using the right plasticizers, the right solvents and the right technique.

In making these compositions, the rubber chloride apparently undergoes no chemical change. The rubber chloride of a dried varnish coating can be redissolved in toluol and recovered with its original properties.

We have found that by an addition of organic accelerators for the vulcanization of rubber, preferably with sulfur, to rubber chloride compositions and heating the composition, we produce changes, chemical or physical, in the rubber chloride giving it bettered properties; the softening point of the composition is raised, the solubility is decreased and adhesion to metals and other materials is improved. While, as stated, rubber chloride is an extremely inert and stable material soluble in but few solvents, the product of the present process is even more stable and inert and its solubility in any solvent is markedly lessened. It is, for example, made resistant to the coal tar oils in which the original rubber chloride is quite soluble. The change in all properties is progressive going to a maximum. Sometimes a complete action is desired and sometimes it is not. The degree to which it is desirable to carry the action varies with different purposes and the degree effected can be estimated as a matter of test by exposing a film dried on metal to the action of liquid toluol. Completely changed material neither dissolves nor swells, while intermediate products swell more or less. Unchanged rubber chloride dissolves at once.

The nature of the internal changes, chemical or physical, or both, is not known. The action may be called a vulcanization since the changes from a soluble to solvent resistant and thermoplastic to heat resistant states are analogous to the results obtained by the vulcanization of rubber. However, since sulfur is not essential to produce the insolubilizing and heat resistance, it is preferable to call the general change by some other name than vulcanization. In the Raynolds Patent 2,148,831, which issued February 25, 1939, this change or result is called "petronization." For the sake of consistency, we adopt this name, although the terms "curing," "insolubilizing" or "vulcanizing" were generally used by us prior to the issuance and filing date of this Raynolds patent.

There are very many bodies capable of exercising a petronizing effect on chlorinated rubber. All are, however, bodies which in one way or another have some chemical relation to rubber substance, which on admixture with rubber and heating will produce chemical changes therein. Organic accelerators for the vulcanizing of rubber are petronizing agents, particularly in the presence of sulfur.

Petronization is an action that may take place in the cold and is much accelerated by heating. The heating temperatures necessary are fairly low, being of the order of 80° to 100° C. Somewhat higher temperatures are not injurious even up to 200° C. and in a way time and temperature are reciprocal. In heating at 153° C. the chlorinated rubber is rendered insoluble in benzol in 10 minutes when no organic accelerator and sulfur are present. In heating at 80° C. the period required is of the order of some hours. The degree of change can be followed by a toluol test and action interrupted at any desired point.

The following petronizing agents have been used with success with halogen containing rubber derivatives such as rubber chloride and rubber hydrochloride:

Piperidine pentamethylene dithiocarbamate.
Butyraldehyde aniline (aniline reacted with butyric aldehyde (2 to 8 molecules) in the presence of butyric acid); known as "808" accelerator.
Tetramethyl thiuram monosulphide.
Tetramethyl thiuram disulphide.
Zinc dimethyl dithiocarbamate.
Hexamethylene tetramine.
Benzothiazyl disulphide.
Thiocarbanilide.
p-Nitrosodimethyl aniline.
Benzo-thiazyl-thiobenzoate.
A-19 (aldehyde-amine type).
Heptaldehyde aniline and diphenyl guanidine.

These so-called petronizing agents are all preferably used with sulfur.

These various petronizers are all substances exercising chemical and physical action on rubber; reacting with the rubber molecule and changing the character of the rubber. All of them are in use in accelerating the union of rubber with sulfur in vulcanization, and are commonly called organic accelerators.

The petronizer should be intimately incorporated with the rubber chloride composition. It may be brought into solution in the adhesive or ground in or on a mill. In the composition, any of the basic stabilizers of chlorinated rubber mentioned, magnesium oxide, litharge, etc., must be well dispersed and in intimate contact with the rest of the composition.

Although the invention has been described above with relation to the adhesive use of steel and rubber, it is not intended to so limit it except as necessitated by the prior art. The composition is operable to unite rubber and rubber-like materials such as polymerized chloroprene, polymethylene-polysulphide plastics to other materials generally, including iron and steel, copper, brass, aluminum, thermosetting resins, porcelain, glass, wood, paper, etc.

In the examples given, the amount of volatile solvent is sufficient to produce a readily flowable composition, which can be used as an adhesive and dried in place by evaporation. The composition shown in the table may be extruded, cast, milled together with fillers on rubber mills, etc. In so doing, it is preferred to use merely enough volatile solvent to enable working and afterwards this small quantity of solvent is evaporated. The compositions are plastic and can be hot molded, etc., but in the presence of a petronizer, after molding or in the later stage of molding, they lose plasticity and become firm at the temperature used.

In making plastic compositions for molding, etc., the same quantities of the various bodies mentioned may be used as given in the table. Various fillers such as fine magnesium oxide may be employed. Softeners such as dibutylphthalate chlorinated paraffin, halo wax, etc., may be added to obtain special softness. The plastic composition may be extruded while hot in the form of a thread or a wire insulation.

Solvated rubber chloride may be incorporated with petronizer on the mill and the mass calendered in sheets, calendered to fabric, metal, thermosetting plastics and paper, sheared, hot molded, etc. A final hot treatment is used to effect petronization in the sheet.

While there has been disclosed with considerable detail certain preferred manners of performing this invention, it is not intended or desired to be solely limited thereto, for as hitherto stated the procedure may be modified, the precise proportions of the materials utilized may be varied, and other materials having equivalent properties may be employed if desired without departing from the spirit and scope of the invention as defined in the appended claims.

What we claim is:

1. An adhesive cement for uniting rubber and the like to metal and the like, said cement consisting essentially of rubber chloride, a volatile solvent, sulfur, and a minor amount of an organic accelerator for the vulcanization of rubber.

2. The composition of claim 1, wherein the organic accelerator comprises piperidinium pentamethylene dithiocarbamate.

3. The composition of claim 1, wherein the organic accelerator is present in an amount of the order of 1 per cent on the rubber chloride.

4. The process of treating rubber chloride to modify its physical properties which comprises mixing normal rubber chloride with sulfur, and a minor amount of an organic accelerator for the vulcanization of rubber in the presence of a volatile solvent and subsequently eliminating solvent from the resulting composition.

5. The process of claim 4 wherein there is sufficient volatile solvent present to form a fluid dispersion which is applied to a surface before eliminating the solvent.

6. The process of claim 4 wherein the said organic accelerator is added in an amount of the order of 1 per cent on the rubber chloride.

7. The process of treating rubber chloride to modify its physical properties which comprises mixing normal rubber chloride with sulfur and an amount of organic accelerator of vulcanization of the order of 1 per cent on the rubber chloride in the presence of a volatile solvent and subsequently eliminating solvent from the resulting composition and heating to a temperature and for a period sufficient to vulcanize the rubber chloride.

HERBERT A. WINKELMANN.
EUGENE W. MOFFETT.